March 21, 1967 J. C. VITTONE 3,309,759
METHOD OF RECONSTRUCTING A FRAME
Original Filed Jan. 8, 1964 4 Sheets-Sheet 1
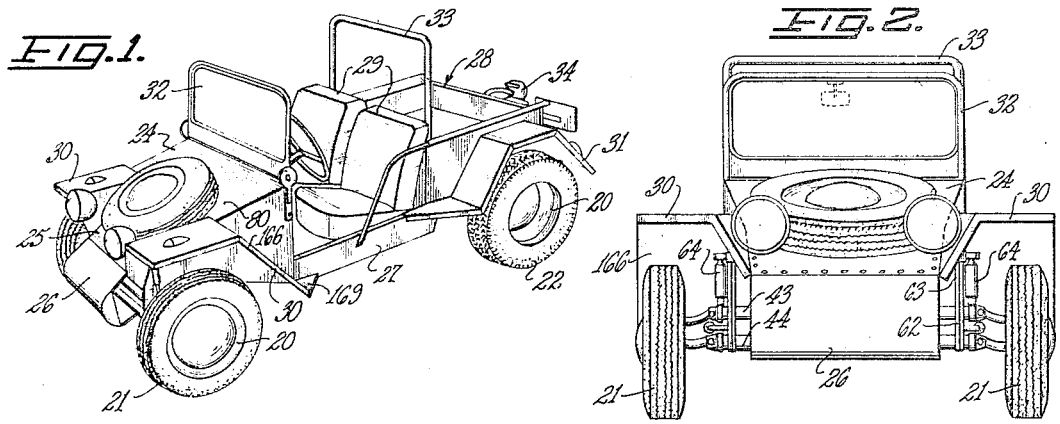
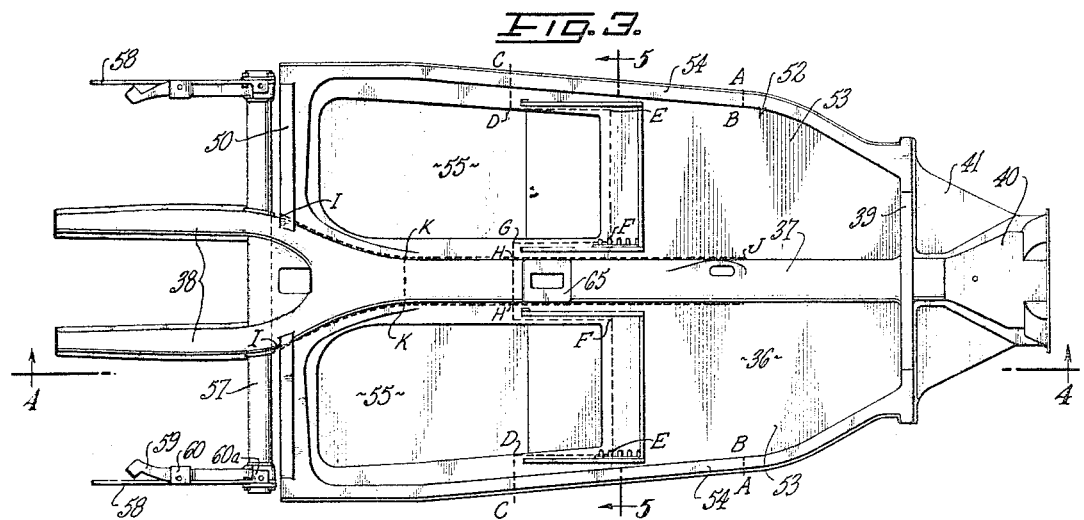
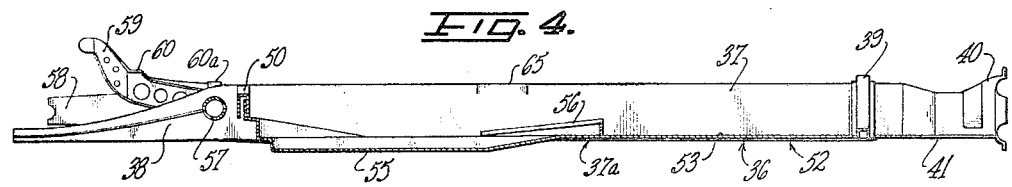
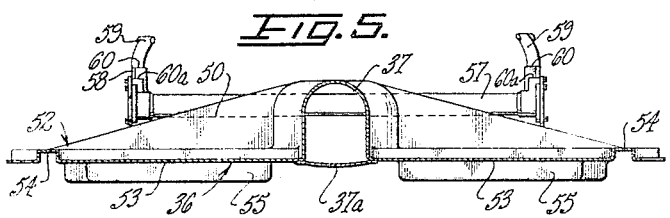
INVENTOR.
JOSEPH C. VITTONE
BY Forrest J. Lilly
ATTORNEY

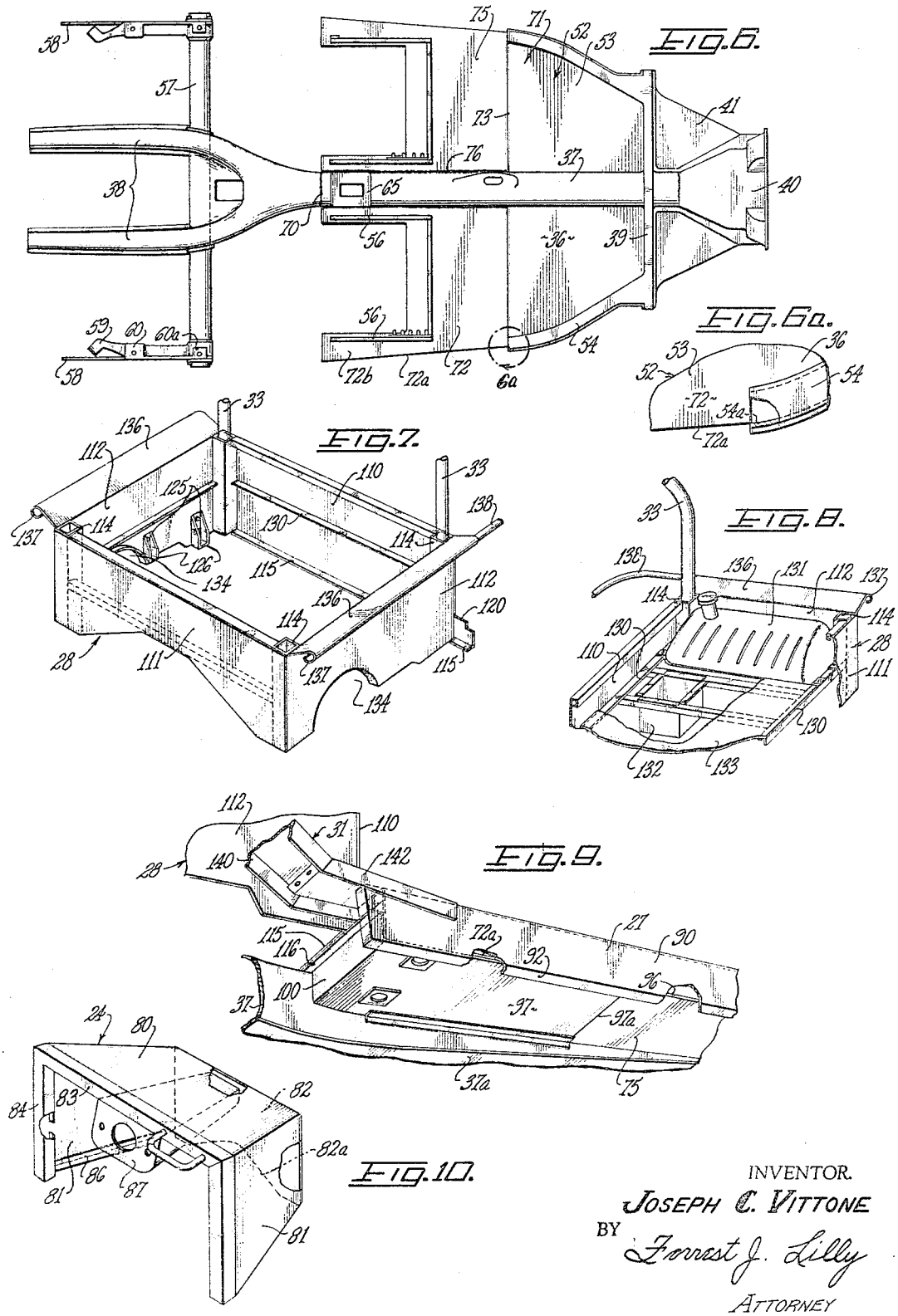

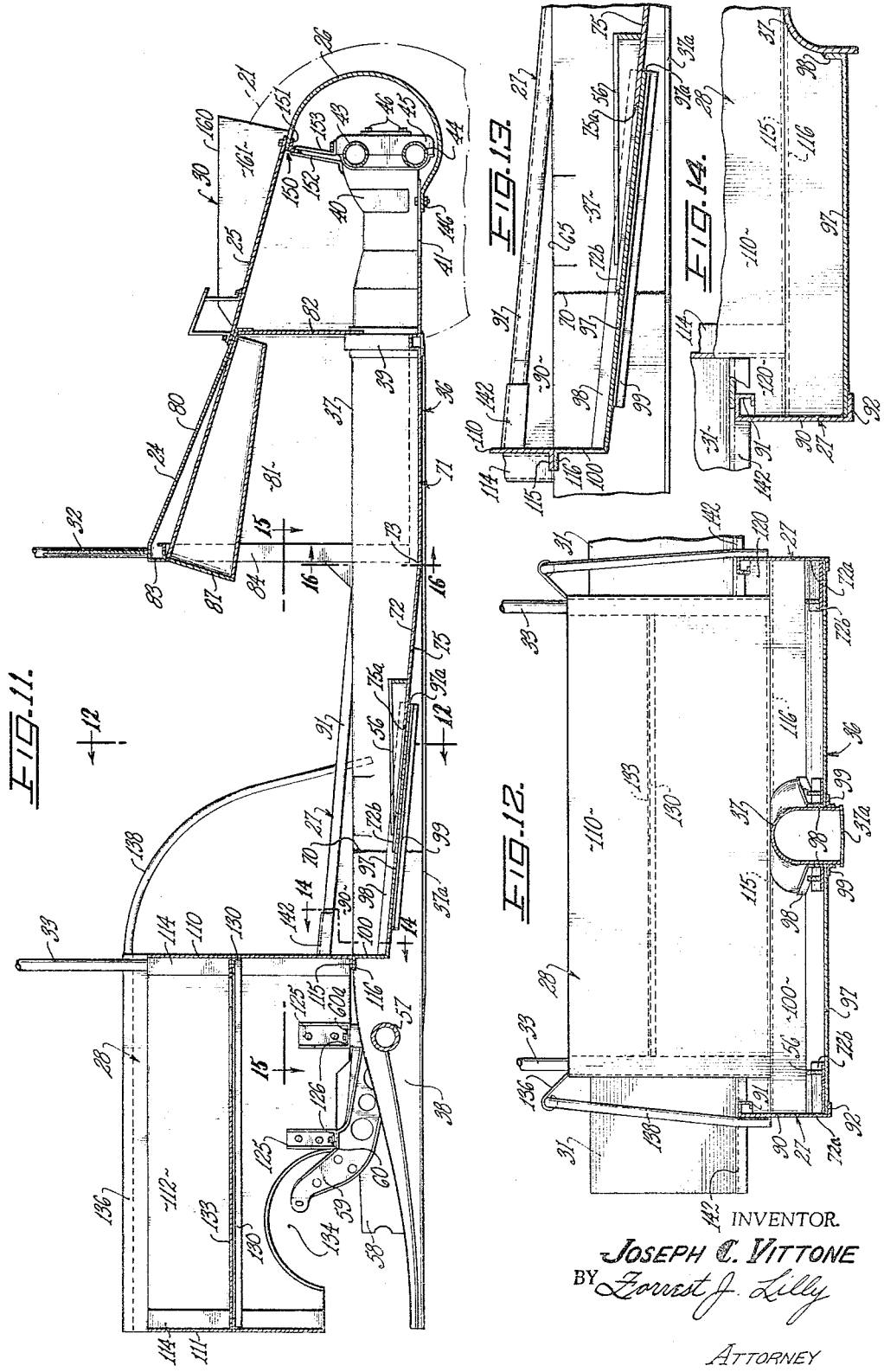

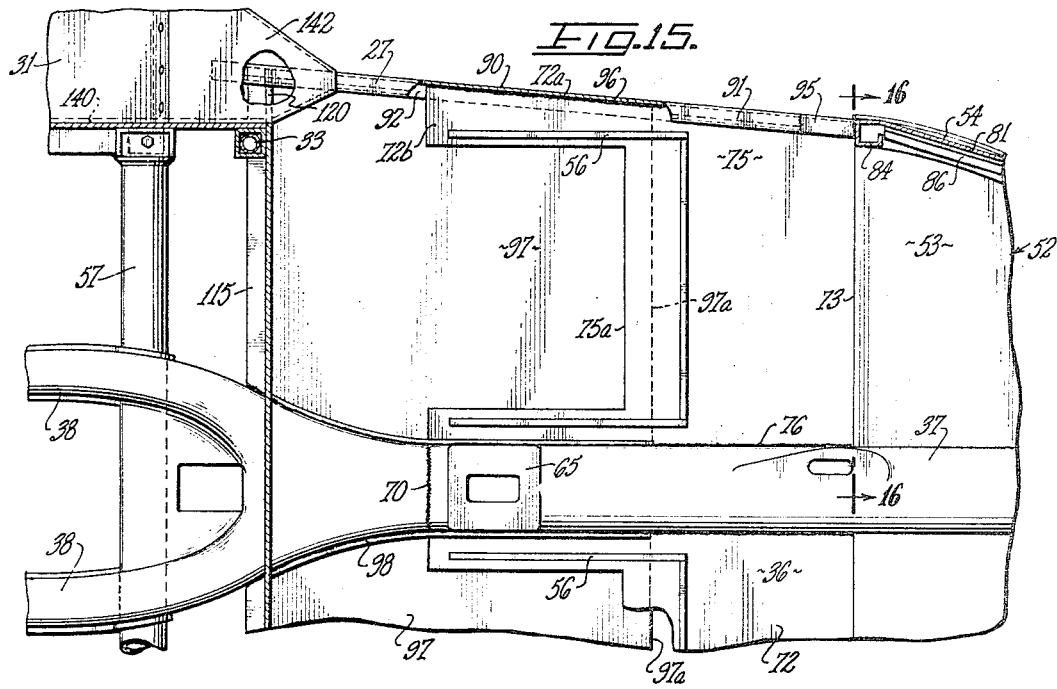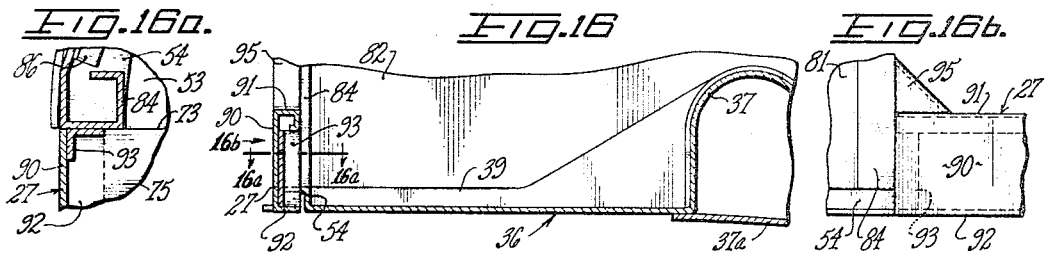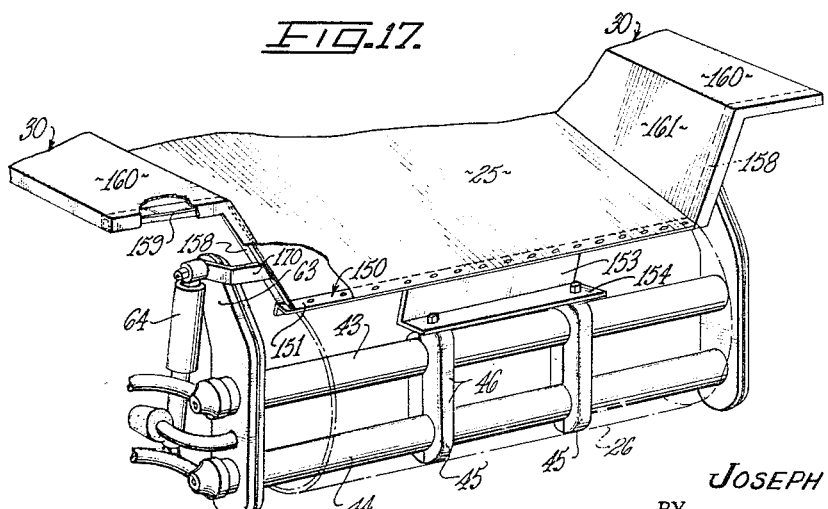

United States Patent Office 3,309,759
Patented Mar. 21, 1967

3,309,759
METHOD OF RECONSTRUCTING A FRAME
Joseph C. Vittone, P.O. Box 169,
Riverside, Calif. 92502
Continuation of application Ser. No. 336,463, Jan. 8,
1964. This application May 19, 1966, Ser. No. 551,465
10 Claims. (Cl. 29—155)

This application is a continuation of 336,463, filed Jan. 8, 1964, now abandoned.

This invention relates to a method of reconstructing a frame for motor vehicles, more particularly of the off-the-road type, intended for use over rough and rugged roadless terrain, up steep hills, over rocks, dry washes, through gullies, or on bad or severely rutted roads.

For such uses, special vehicles have been constructed in the past, and have usually been of the four-wheel-drive type. Vehicles for this type of service are generally fairly expensive.

A general object of the present invention is the provision of a method of reconstructing a frame for a light and inexpensive two-wheel-drive vehicle for off-the-road service of the kind mentioned.

The vehicle contemplated by the invention is one which may be driven on or off the highway, and when off the highway, is one which can be driven through rough and hilly back country, either for the sport of negotiating difficult terrain in a power vehicle, or to penetrate back country areas otherwise accessible only by long and hard hiking or by horseback, or possibly by special motorcycle.

The vehicle contemplated by the invention is of a very light and compact two-passenger type, with provision for carrying camping, hunting or fishing gear, but otherwise characterized by small size, low cost, and unusual simplicity. The vehicle contemplated by the invention is further characterized by high and even spectacular performance over rugged terrain in the type of service described.

Objects of the invention are the provision, by a simply executed procedure, and at low cost, of a vehicle meeting the conditions mentioned in the foregoing, and characterized further by a short wheel base, exceptional road clearance, rugged construction capable of withstanding the type of service contemplated, and by certain protective features against hazards such as boulders to be driven over, or sharp rises or changes in the inclination of the terrain which might be struck by a vehicle traveling thereover.

The basic concept of the invention is the construction of a vehicle of the type mentioned from a wrecked or used sedan of a certain well-known European make, the Volkswagen, currently easily available at low cost, and the invention in one aspect comprises a reconstruction process by which such a vehicle can be easily, and comparatively inexpensively, radically modified to achieve an off-the-road vehicle having the desired features heretofore mentioned. In another aspect, it is a broad object to provide a unique off-the-road car, of simple and unique construction, having these desirable features.

For driving over rough or rocky terrain, it is, of course, desirable that large road clearance be provided. It is also desiable that the vehicle have a comparatively short wheel base. Thus, a vehicle of large road clearance but long wheel base, traversing a sharp crest at the top of a rise, for example, can easily strike its underside at a point between the wheels, whereas a short wheel base vehicle of the same clearance would completely clear the same crest.

My invention includes the discovery that the characteristic standard platform frame of the Volkswagen is, fortuitously, suited to certain unobvious modifications which I have found to be possible, easily made, and entirely practicable, and which convert the original vehicle into one altered to meet the basic requirements of an off-the-road vehicle. In practicing the invention, the entire original body of the original vehicle is removed from the chassis and discarded, the chassis being retained. The unique, characteristic platform frame of the Volkswagen is preserved, but shortened by cutting and removing a twelve inch section of its so-called backbone or tunnel, and a large portion of the original frame, and pan or floor, is cut away and discarded. This results in shortening the wheel base of the chassis by a foot, reducing it to 82½ inches, which I have found to be both possible and ideal. The pan or floor of the frame is originally partly at and partly below the bottom level of the frame tunnel, and in rebuilding the frame, this pan is rebuilt and repositioned so that the front portion thereof remains at the bottom level of the frame tunnel, but approximately the rearward two-thirds thereof rise on an angle to a higher and higher elevation on the frame tunnel. The progressively increasing road clearance in the rearward direction as so provided is of material importance, it being a matter of experience that the great majority of collisions between the pan and high spots in the terrain driven over occur within the rearward area of the pan. The frame tunnel, of course, remains below the road clearance level afforded by the elevated pan. However, the informed and qualified driver, seeing a high spot or boulder ahead, can generally drive so that the tunnel, which is only a relatively few inches in width, will pass to one side or the other of the obstruction.

The frame being thus shortened and partly cut away, as mentioned, components for completing a novel frame are fabricated and welded to the remainder of the original frame, and in the course of this procedure, the pan or floor is elevated, as already described.

A feature of the new vehicle frame is a curved heavy-gauge steel plate at the front which is utilized as a bumper. Unlike ordinary bumpers, however, this bumper is contained between and within the outside circles defined by the front tires. Terminating short of the forwardmost portions of the tires, the tires will necessarily strike a large obstruction before the bumper does. However, the hood and the front fenders also terminate well rearwardly of the forwardmost portions of the tires, so that in many cases, the tires function as bumpers. The bumper plate serves to protect the frontal area of the vehicle between the tires against collision. In traveling up and down over very rugged territory, it is easily possible for the bumper plate, if positioned out in front of the tires, to collide with a sharp rise or mound of earth, or a boulder. But by positioning the bumper plate back between the tires, in a somewhat withdrawn position, the tires, one or the other, or both, will generally encounter the rise or mound before the bumper plate, and will thus elevate the vehicle over the rise, rather than permitting such a collision. This unique location for the bumper is an important feature of the invention.

The invention will be better understood from the following detailed description of an illustrative embodiment of the invention, and showing the construction thereof from the chassis of an original sedan. Reference for this purpose is had to the accompanying drawings, in which:

FIG. 1 is a perspective view of a completed embodiment of an off-the-road vehicle in accordance with the invention;

FIG. 2 is a front elevational view thereof;

FIG. 3 is a plan view of the so-called platform frame of a standard make of vehicle from which the frame of the vehicle of the invention is constructed, and showing thereon the location of certain cuts to be made in the practice of the present invention;

FIG. 4 is a section taken on line 4—4 of FIG. 3;

FIG. 5 is a transverse section taken on line 5—5 of FIG. 3;

FIG. 6 is a plan view of the frame of FIG. 3 after the performance of certain modifications in accordance with the invention;

FIG. 6a is an enlarged detail of a portion of the frame of FIG. 6 as shown within the dashed circle 6a of FIG. 6;

FIG. 7 is a perspective view of the box of the vehicle of the invention, shown detached from the vehicle;

FIG. 8 is a perspective view of a portion of the box of the invention, shown with the addition of a gas tank, battery box and floor;

FIG. 9 is a fragmentary perspective view looking upward from underneath the modified frame of the invention from a point approximately opposite the right rear wheel;

FIG. 10 is a perspective view of a cowl in accordance with the invention;

FIG. 11 is a longitudinal section through the modified vehicle of the invention, taken in a plane represented by the line 11—11 on FIG. 12;

FIG. 12 is a transverse section taken on line 12—12 of FIG. 11;

FIG. 13 is an enlarged fragmentary view taken from FIG. 11;

FIG. 14 is a section taken on broken line 14—14 of FIG. 11;

FIG. 15 is a view taken in accordance with section line 15—15 of FIG. 11;

FIG. 16 is a section taken on line 16—16 of FIG. 15;

FIG. 16a is a fragmentary detail taken on section line 16a—16a of FIG. 16;

FIG. 16b is a fragmentary detail taken in the direction of the arrow 16b in FIG. 16; and FIG. 17 is a perspective view of a portion of the front end of the vehicle of the invention, the bumper plate being removed and shown in phantom lines.

Reference is first directed primarily to FIGS. 1 and 2, showing an illustrative vehicle in accordance with the invention, made by conversion of a chassis, i.e., the frame, running gear, front and rear suspension, steering and braking mechanism, etc., from a Volkswagen sedan. The original engine may also be used, though it is also possible to use a more powerful engine from certain other rear drive vehicles such as a Porsche or Corvair. The original body has been discarded, and the frame extensively modified. New body parts are welded to and function as structural parts of the new or modified frame. As shown in FIG. 1, the vehicle has wheels 20, and these are preferably equipped with large front and rear "snow" tires 21 and 22, respectively, for improved traction. The vehicle has a forwardly sloping cowl 24, a correspondingly sloping flat hood or hood plate 25 (see also FIG. 11), curved heavy-gauge sheet metal bumper plate or nose 26, low side rails 27 which are structurally integrated into the frame, sturdy sheet metal box 28 which is also structurally integrated into the frame, and constitutes a part thereof, seats 29, front and rear fenders 30 and 31, respectively, folding windshield 32 mounted on cowl 24, and roll bar 33. At the rear, mounted in the usual way on the frame fork, is the engine, fragmentarily appearing at 34 in FIG. 1.

FIGS. 3–5 are views of a standard, unmodified platform frame 36, such as is recoverable from a used Volkswagen sedan. This frame is modified in various ways, as presently to be described, to furnish the unique frame of the present vehicle. The platform frame 36 as shown in FIGS. 3–5 has been in use for many years and is very familiar to those acquainted with the art. It must, however, be briefly described. In general terms, this frame, as originally manufactured, comprises essentially a tubular sheet metal "tunnel" or "backbone" 37, somewhat in the form, in cross section, of an inverted U (FIG. 5), the bottom of which is closed and completed by a metal plate 37a welded in place. The rearward end of the tunnel is forked, the furcations 38 receiving the vehicle transmission and final drive unit, not illustrated, between them. As well known, and not necessary to illustrate herein, the transmission and final drive unit are mounted to the fork of the frame, and the engine is bolted to the transmission and final drive unit case. These latter relationships remain undisturbed in the new vehicle.

Near the front end of the frame, the tunnel 37 merges with a transversely extending so-called "front cross member" 39, projecting laterally outwardly from opposite sides of the tunnel. Joined to this front cross member and extending forwardly therefrom is the "frame head" 40, which includes a floor level reinforcement plate 41 joined to cross member 39. Frame head 40 is adapted to engage the usual upper and lower front torsion bar tubes 43 and 44 of the front suspension, and to be rigidly clamped thereto by clamp bars 45 and screws 46 (FIGS. 11 and 17). Just rearwardly of the beginning point of the fork in the tunnel, there is joined to the tunnel furcations 38 so-called "frame end plate" 50, extending transversely of the tunnel and laterally outward on opposite sides thereof. A floor, "pan," or platform 52 is provided, comprised of two sheet steel floor plates 53 welded into position between the front cross member 39 and the frame end plate 50, along the bottom edges of the tunnel 37, one on each side of the latter. The longitudinal edges of the platform 52 are provided with raised box sections 54 for stiffness, and the original vehicle body (not shown) rests on and is bolted to these box sections 54. The rearward portions of floor plates or pans 53 are shown as formed with the usual depressions 55 for gain of foot room for the rear seat passengers, dropping to a level below the lower level of the tunnel, and thereby reducing road clearance by a small but seriously important extent for the purpose of the car of the present invention. The depressions 55 are surrounded at the front by front seat rail assemblies 56 mounted on the floor pans 53 in the positions shown.

Immediately to the rear of frame end plate 50, the frame bifurcations 38 support a rear cross tube 57, which is in effect a part of the frame, and which contains rear torsion bars, not shown, but understood to be connected by flat spring plates 58 to the rear axle, also not shown. The extremities of cross tube 57 support brackets 59, which provide certain pads or steps 60 and 60a to which the original body is bolted and also act as upper supports for the rear shock absorbers, not shown. As seen best in FIG. 17, the front torsion bar tubes 43 and 44 are connected at the ends by fixtures 62 which have upward extensions or brackets 63 to which the upper ends of the front shock absorbers 64 are connected. These brackets 63 are utilized in the invention as later described.

The frame and suspension components so far mentioned are well known in the art and no further illustration or description will be required.

To practice the invention, a used or partially wrecked Volkswagen sedan is provided, with the frame, such as illustrated in FIGS. 3–5, front and rear suspension, transmission, running gear, and other components in serviceable condition. The sedan body is removed from the chassis and discarded, and all components disassembled from the platform frame, which then appears as in FIG. 3. This frame is then cut, slit or severed along the dashed construction lines in FIG. 3, resulting in removal of the portions of the pan or floor 52 enclosed within the dashed lines, as well as a twelve inch long section of the tunnel 37. Thus, according to a preferred and illustrative procedure, in accordance with the invention, transverse cuts are made through the box sections 54 of the frame on each side, as from A to B, in a plane located substantially 18 inches to the rear of front cross member 39. Transverse cuts C–D are also made in floor pan 53 on each side, through the box sections 54 and inwardly to D, just aft of the seat rails 56, and approximately two-thirds of the way from front cross member 39 to frame end plate 50. At D, which is a point just inside the outer seat rail, and just outside the floor depression 55, the cut turns forward to E, just ahead of the beginning point of the floor depression. The cut is then made in a transverse direction to F, close to the inner seat rail, just inside the inner line of the floor depression. The cut then extends rearward to G, in line with C–D. It is then extended transversely to H, immediately adjacent tunnel 37, and then extended rearwardly, along the tunnel, and along the front portion of the tunnel fork to I, just rearwardly of the frame end plate 50. The frame end plate 50 is cut entirely off the tunnel, and discarded, along with the severed portion of the floor pan from C to I.

Slits are cut in the remaining portions of the pan from points H forwardly along the tunnel to points J, transversely aligned with the cuts A–B. Transverse cuts are made across and entirely through tunnel 37, the forward cut in a vertical plane through points H and H, just rearward of handbrake lever mounting 65, and the rearward cut along line K—K, in a vertical plane, twelve inches to the rear of the front cut. A twelve inch section of the tunnel is thus removed, and is discarded.

The two cut ends of the tunnel are then joined and welded to one another, as indicated at 70 in FIG. 6. After smoothing and painting, this weld joint is no longer evident. As well known, there are certain conduits, cables and control rods in the tunnel, and these are all shortened by twelve inches to correspond with the shortened tunnel.

The box section 54 on each side of the now remaining portion 71 of the original pan (between cuts A–B and C–D) is then hammered out flat, and into the same plane as the then remaining flat floor portion 72 of the pan, thus widening this floor portion 72 rearwardly of cut A–B. This widened floor portion 72 is then trimmed or cut longitudinally so as to form a new side edge 72a, extending rearwardly along a line which is a prolongation of the line of the inside surface of the outer wall 54a of the box section 54 (FIGS. 6 and 6a). It will be seen that the edge 72a is in the position formerly occupied by the inside surface of the outer wall of the now cut-away portion of box section 54.

The now remaining portion 71 of the original floor pan is bent upwardly on a transverse line 72 which extends between the cuts or slits A–B. The portion 75 of the pan rearwardly of line 73 thus extends rearwardly at an inclination of a few degrees, such as seen in FIGS. 11 and 13. This portion 75 of the pan is supported from below as later to be described, and may be welded to the tunnel, as indicated at 76 in FIG. 6.

The modified frame thus appears at this stage as seen in FIG. 6.

The aforementioned cowl 24 is then mounted on the frame. This cowl, fabricated of 18 gauge sheet steel, comprises a downwardly and forwardly sloping top 80, vertical, forwardly converging sides 81, and a vertical front wall 82. The adjoining edges of these members are formed with welded lap joints to afford a strong structure. The edges of the top and side walls of the cowl facing the driver's position are formed with reinforcing box section formations 83 and 84, respectively. The cowl is shaped and dimensioned to fit down on top of the frame box section 54 and front cross member 39 (FIGS. 6, 11 and 15). The lower horizontal edge portions of sides or side walls 81 rest on the frame members 54, and also have welded thereto angle members 86 which engage the frame members 54, and the side walls 81 and the angle members 86 are welded to the frame members 54. Front cowl wall 82 is shaped as at 82a (FIG. 10) to fit cross member 39, and engages and may, if desired, be welded to the latter. The cowl is here shown to mount an instrument housing and panel structure 87, and also mounts the aforementioned windshield 32.

Special frame side rails 27 are fabricated of 18 gauge sheet steel, and are welded to the cowl and to the rearward ends of the frame box section members 54. These side rails 27 are preferably channel members approximately six inches in depth, and 38¼ inches long, and comprise vertical side walls 90, with inwardly turned box sections 91 along the upper edges thereof, and inwardly turned flanges 92 along the lower edges thereof. They are mounted in a slightly inclined position, rising rearwardly, at the same angle as heretofore given for the sloping pan section 75, i.e., a few degrees. The front ends of these side rails abut the rearward ends of the frame box sections 54 and also the lower portions of the vertical box sections 84 on the side walls of the cowl 24 (FIGS. 1, 15, 16, 16a and 16b). An angle member 93 is welded inside the forward end of each side rail 27, so that one of its flanges abuts the cowl box section 84 (FIGS. 16 and 16a). The end edges of the side rail are welded to the abutting edges of frame section 54 and cowl box section 84, and the flange abutting box section 84 is also welded thereto. For additional strengthening, a triangular gusset 95 is placed in the corner between the top of each side rail 27 and the abutting cowl section 84, and is welded to these members.

The supporting arrangement for the rearward ends of the rails 27 will be considered presently. Attention is directed at this point to FIGS. 12 and 13, showing that the outer edge portions of the rearwardly projecting floor portions or members 72b, defined on the outside by the edges 72a, overlie and are supported by the lower flanges 92 of the side rails. The edge portions of members 72b are welded to the side rails, as at 96 (FIG. 15).

A new rearward floor pan 97, fabricated from 18 gauge sheet steel, is inserted under the rearward portion 72b of upwardly inclined pan portion 75 on each side of the frame tunnel, its forward edge 97a overlapping the edge 75a of pan portion 75, as clearly shown in FIG. 15. The outer edge portions of the pan members 97 engage over and are welded to the bottom flanges 92 of side rails 27 (FIG. 12). The new rearward floor pan members 97 are thus upwardly inclined at the same angle as the side rails and the pan members 75. The inner edges of pan members 97 are provided with flanges 98 which engage and are welded to the tunnel. FIGS. 11 and 13 show that these inner edges of pan members 97 engage the tunnel along an upwardly inclined line. It will be appreciated that the upwardly inclined side rails and pan arrangement provide a gradually increased road clearance in the rearward direction on both sides of the tunnel. Preferably, for additional support of the pan members 97, angle members 99 are welded to the underside of the inner edge portions thereof and to the tunnel, as seen best in FIG. 9. The pan members 97 are thus welded to the frame tunnel 37 and to the side rails 27, tying these members rigidly together. The structure is then further stiffened and stabilized by means of rearward wall members 100 bent upwardly from the pan members 97, these members 100 being cut to fit against the rails 27 and the tunnel 37, and being welded thereto. A stiffened structure is thus afforded between the rearward end portions of the rails. These rearward end portions of the rails are then sturdily mounted to the furcations 38 of the "backbone" or tunnel portion of the shortened platform frame, utilizing for this purpose certain of the "skin" structure of the aforementioned "box" 28, and also the previously mentioned body support pads or steps 60 and 60a. These arrangements will next be described.

Box 28 is fabricated, as are all the frame components, from 18 gauge sheet steel. It comprises a front wall 110, coplanar with rearward pan walls 100, together with a rearward wall 111 and side walls 112. These box walls meet and are welded to one another edge-to-edge, and square, box-braces 114 are welded into the corners of the box. The horizontal lower edge of front wall 110 has a rearwardly turned flange 115, which engages and is welded to rearwardly turned flanges 116 on the upper edges of rearward vertical pan walls 100. The front wall of the box is thus structurally integrated to the pan walls 100, and through the latter to the rails 27. Front box wall 110 also has, projecting laterally outward from its two lower corners, a pair of structural bracing tabs 120 which engage under, and are welded to, the box section portions 91 of side rails 27 (FIG. 14). The flange 115 along the bottom edge of box front wall 110 will be seen to continue along the tabs 120, which are thus strengthened.

The side walls 112 of the box have welded to the inner surfaces thereof a pair of mounting brackets 125 which include vertically braced bottom walls 126 which are aligned with and engage and are welded to the aforementioned body steps 60 and 60a on the bracket arms 59, it being recalled that the latter are fixed on the ends of cross tube 57 fixed to the frame furcations 38. This cross tube 57 is strong, and sturdly supported from the furcations 38, having been initially designed to assume the support of the rearward end of the original sedan body. It will be seen that the side rails 27 securely tie the cowl structure and the front part of the original platform frame to the box structure mounted on the rearward frame bracket arms 59 which originally supported the sedan body, and that the weight on the floor and side rails is transferred at the rear through portions of the front wall 110 and side walls 112 of the box to these frame bracket arms 59. The side rails comprise, in effect, low sides for the vehicle, and act also as front-to-rear structural frame components paralleling the frame tunnel, and integrated to the latter through the structures heretofore explained. It is a novel feature of the invention that the rearward end portions of rails 27 are structurally integrated, by welding, to the vertical rearward pan walls 100, which are in turn welded to front box wall 110, and are also directly integrated, by welding to lateral front box wall tabs 120, and thus to front box wall 110. The pan walls 100 and front box wall 110 thus assume stressing from the side rails 27 and pan and the loading thereon. This stressing of box wall 110 continues through the side box walls 112 to the mounting brackets 125 which rest on and are welded to the frame supported steps 60 and 60a. The stress loading at the rear is thus carried from the pan and the side rails to the frame members 59 through the pan and box walls 100, 110 and 112, in a strong "stressed-skin or monocoque fashion.

Box 28 is shown to be completed by flanges 130 supporting a gas tank 131, a battery box 132, and a floor 133. Box side walls 112 are formed, concentrically with the rear axles, with arcuate cutouts 134 to afford necessary clearance and access, and the rearward box wall 111 is shaped to afford necessary clearance as indicated. The upper portions of side walls 112 preferably have outwardly bent portions 136, rolled over at their upper edges as at 137 to receive the rearward end portions of hand rails 138, the opposite ends of which are welded to side rails 27 (FIG. 1). The two front box braces 114 of the box 28 receive and support the lower end portions of roll bar 33.

The aforementioned rear fenders 31 are flanged, as at 140 in FIGS. 9 and 15, and are securely fastened through these flanges, as by bolting, to the box sides 112. A downwardly flanged sheet metal step 142 is fitted over and welded to the rearward end portion of each side rail 27, and extends back and is bolted to rear fender 31.

The aforementioned sloping hood plate 25 is securely fastened at its rearward edge, as shown best in FIG. 11, to the forward edge of the top wall of cowl 24. The front edge of hood plate 25 marginally overlies the upper, rearward edge portion of the previously mentioned cylindric bumper plate 26, which is of heavy gauge sheet steel, e.g., 14 gauge. This bumper plate curves forwardly, downwardly, and under the frame head 40, and its under inner edge portion 146 is bolted to the underside of frame reinforcement plate 41 (FIG. 11). It will be observed from FIG. 11 that the arc of bumper plate 26 is spaced within the perimeter of the front tires 21 of the vehicle. The upper edge portion of the bumper plate 26 is sturdily braced from the frame head 40. As here shown, a front fender yoke 150, fabricated of angle iron, has a central angle member 151 whose upper flange underlies the overlapped edge portions of bumper plate 26 and hood plate 25, and these three members are bolted together, as indicated (FIG. 11). To the back of the other flange of angle member 151 is welded a heavy brace 152, whose lower end is welded to frame head 40; and to the front of said other flange is welded a heavy brace 153 extending from a base flange 154 which is bolted to the aforementioned clamp bars 45.

The bumper 26 is thus securely mounted to the frame at its two edges. It is heavy and rugged, and somewhat resilient, such that, upon a collision, its generally cylindrical form will tend to flatten somewhat, and then elastically spring back. By being between and inside the perimeter of the tires, the bumper 26 functions only as regards objects between and in back of the front arcuate portions of the tires. The tires themselves take over the bumper function outside the two ends of the bumper 26. The benefit arising in a rough-road vehicle of the character described from having the bumper inside the periphery of the tires has been amply stated hereinbefore.

Fender yoke 150 includes, in addition to the central cross member 151, two upwardly and outwardly inclined angle members 158, to which are joined two horizontal and outwardly extending angle members 159. The front fenders 30 include flat top portions 160 which are flanged downwardly over and bolted to the outer yoke members 159, and sloping portions 161 which are shaped along their inner edges to lie against the side walls 81 of the cowl. These fender portions 161 may be mounted on the cowl walls 81 in any suitable manner, as by use of angle strips (not shown) welded to the fender members and bolted to the cowl walls 81. The front fender portions 160 also have connected thereto downwardly bent portions 166, which are flanged under the hood plate 25 and bolted thereto, and are also flanged over the angle members 158 of loke 150, and bolted thereto.

A triangular sheet metal step 169 is fitted between the rearward edge of each front fender and the side rail 27, and is welded to the latter. It may be flanged and bolted to the fender.

Brackets 170 welded to yoke members 158 and connected to shock absorber brackets 63 afford sturdy support for the yoke 150 and front fenders from the chassis.

In the fabrication of the vehicle, the original frame is cut and shortened first, so that it appears as in FIG. 6. The cowl 24 is fabricated, and then added to the frame. Preferably, the box 28 is fabricated, and added to the frame next. The side rails 27 and new floor 97 are next added. Brace 152, carrying yoke 150, is mounted on the frame head, and the hood plate 25 is added. With the bumper plate 26 removed, the frame head is assembled with the torsion bar tubes 43 and 44 and the remainder of the conventional front suspension, axles, steering equipment, etc. With clamp bars 45 is place, brace 153 is bolted down. Brackets 170 are connected to the shock absorber brackets 63, and the shock absorbers are installed. The conventional transmission assembly, rear torsion bars, spring plates, and rear shock absorbers are then added, as will be readily understood by those skilled in the art. The engine can then be installed. For necessary road clearance, the usual junction boxes and heater assemblies are removed, and new exhaust pipes (not shown) are installed at a higher level, as will be well within the skill of the art without further instruction.

The brake pedal cluster, master cylinder, hydraulic lines and emergency brakes are then installed in the usual manner, and no illustration of these conventional parts is required. It should be noted, however, that the throttle cable, clutch cable and emergency brake cable are necessarily shortened by twelve inches. The gearshift lever and rod, with the rod shortened twelve inches, are then installed, and, again, no illustration of these conventional parts will be required. Finally, seats 29 are installed in the conventional manner on the seat rails 56.

It is believed that the off-the-road vehicle of the invention will now be understood, and its features and advantages will be appreciated, as will the process of the invention by which this unique vehicle may be constructed by conversion of a conventional Volkswagen chassis and addition of novel component parts thereto.

It will, of course, be understood that the presently disclosed embodiment of the invention, while now preferred, is for illustrative purposes only, and various changes in design, structure arrangement and procedure may be made without departing from the spirit and scope of the invention or of the appended claims.

What is claimed is:

1. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, that comprises:
   cutting away and discarding rearward portions of said floor plates, including making cuts extending inwardly from the outer longitudinal edges thereof to said tunnel, and along said tunnel forward'y of said fork for a distance of at least substantially a foot;
   severing said tunnel at two transverse planes substantially a foot apart within the region along which said floor plates are cut away, and removing a corresponding section of said tunnel;
   welding together the remaining cut ends of the tunnel;
   and reconstructing the floor plates to cover over areas opened up by the cutting away of portions thereof.

2. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, that comprises:
   cutting away and discarding rearward portions of said floor plates, including making cuts extending inwardly from the outer longitudinal edges thereof to said tunnel, and along said tunnel forwardly of said fork for a distance of at least substantially a foot;
   severing said tunnel at two transverse planes substantially a foot apart within the region along which said floor plates are cut away, and removing a corresponding section of said tunnel;
   welding together the remaining cut ends of the tunnel;
   securing the forward ends of generally longitudinal frame side rails to the rearward extremities of remaining portions of the floor plate box sections on each side;
   providing support for the rearward end portions of said side rails from said fork of said tunnel;
   and installing new floor plates to cover the floor areas opened up by the cutting away of portions of the original floor plates, including supporting the edges of said new floor plates both from the tunnel and and from said frame side rails.

3. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, that comprises:
   cutting away and discarding rearward portions of said floor plates, including making cuts extending inwardly from the outer longitudinal edges thereof to said tunnel, along said tunnel for a distance of at least substantially a foot, and along said fork to said frame end plate;
   also cutting away said frame end plate from said fork;
   severing said tunnel at two transverse planes substantially a foot apart within the region along which said floor plates are cut away, and removing a corresponding section of said tunnel;
   welding together the remaining cut ends of the tunnel;
   and reconstructing the floor plates to cover over areas opened up by the cutting away of portions thereof.

4. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, that comprises:
   cutting away and discarding rearward portions of said floor plates, including making cuts extending inwardly from the outer longitudinal edges thereof to said tunnel, along said tunnel for a distance of at least substantially a foot, and along said fork to said frame end plate;
   also cutting away said frame end plate from said fork;
   severing said tunnel at two transverse planes substantially a foot apart within the region along which said floor plates are cut away, and removing a corresponding section of said tunnel;
   welding together the remaining cut ends of the tunnel;
   securing the forward ends of generally longitudinal frame side rails to the rearward extremities of remaining portions of the floor plate box sections on each side;
   providing support for the rearward end portions of said side rails from said fork of said tunnel;
   and installing new floor plates to cover the floor areas opened up by the cutting away of portions of the original floor plates, including supporting the edges of said new floor plates both from the tunnel and from said frame side rails.

5. The method of claim 4, including providing the new floor plates with support both from said tunnel and from said side rails in a plane which inclines upwardly and rearwardly longitudinally along the tunnel.

6. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, two laterally spaced front seat rails on each of said floor plates approximately midway between said front cross member and said frame end plate, each of said floor plates having a depression therein, so as to drop below the tunnel, said depression extending forwardly from a position near said frame end plate to a position between said two seat rails, that comprises:

cutting away and discarding rearward portions of said floor plates, including making cuts extending laterally inwardly into the floor plates from the longitudinal edges thereof and crossing behind the outer seat rails, extending the cuts forwardly between the outer seat rails and the floor depressions, around the front boundaries of the floor depressions, thence rearwardly to points shortly rearward of the inner seat rails, thence to the tunnel, and along the tunnel and the front part of the fork to the frame end plate, and cutting away also the frame end plate;

cutting the remaining portions of the floor plates along the tunnel to points approximately a foot and a half short of the front cross member;

making cuts inwardly through the raised box sections of the two floor plates along lines in approximate alignment, transversely of the tunnel, with said last-mentioned points, said last-mentioned cuts and points defining a transverse floor plate bending line;

flattening the raised box sections of the floor plates into the planes of the floor plates rearward of the last-mentioned cuts, and thereby widening the remaining portions of the floor plates aft of said last-mentioned cuts;

trimming excess metal from the widened portions of the floor plates outside longitudinal lines projected rearwardly from the outer boundaries of the remaining box sections on the remaining front portions of the floor plates;

securing the forward ends of generally longitudinal frame side rails of channel section in position to the rearward extremities of the remaining floor plate box sections on said side, said rails in their position of securement having inwardly facing lower flanges on their lower edges, and providing support for the rearward end portions of said side rails from said fork of said tunnel, the side rails being so positioned that the latter assume an upward inclination in a rearward direction, with their said flanges being at the bottom of the tunnel at the forward extremities of the channel, and at a higher elevation relative to the tunnel at the rearward extremities of the side rails;

positioning the remaining portions of the original floor plates, aft of said transverse bend line, with their edge portions within said channels, with said floor plate portions bent on said bend line to the angle of said side rails, and supported along their outer edges by the lower flanges of said side rails;

and positioning new floor plate members aft of the rearward edges of the remaining portion of the original floor plates, with the outer longitudinal edge portions of said new floor plate members over and supported by the lower flanges of the side rails, and with the inner longitudinal edges of said new floor plate members supported from the tunnel at said angle of inclination of said side rails.

7. The method of reconstructing a standard automotive sedan vehicle frame to one for service in an off-the-road class of vehicle, said standard frame being of the type having a horizontally disposed, longitudinal sheet metal tunnel provided at its forward end portion with a front cross member extending laterally in opposite directions therefrom, with a fork at its rearward end, a frame end plate projecting laterally from the furcations of the fork, and floor plates joined to and extending between said front cross member and said frame end plate, with inner edges of said floor plates joined to the bottom of said tunnel, and outer longitudinal edges thereof formed to include raised reinforcing box sections, that comprises:

severing said tunnel at forward and rearward transverse planes by making parallel forward and rearward cuts therethrough substantially a foot apart in a region just forwardly of said fork;

making forwardly located cuts in said floor plates between forward edge points located along opposite longitudinal side edges thereof and points adjacent to said tunnel;

said cuts through said floor plates and the ends of said forward cuts through said tunnel being formed so as to join one another;

making rearwardly located cuts in said floor plates between edge points thereon that are rearward of said first mentioned edge points and points adjacent to said tunnel, with said last mentioned cuts in said floor plates and the ends of said rearward cuts through said tunnel joining one another;

all in such manner that the portions of said floor plates between said forwardly and rearwardly located cuts therein, and a portion of said tunnel between said transverse planes, are cut free of and removed from the frame;

welding together the remaining cut ends of the tunnel;

and reconstructing the floor plates to cover over areas opened up by the cutting away of portions thereof.

8. The method of claim 7, wherein said rearwardly located cuts in said floor plates extend along the tunnel on both sides thereof aft of said rearward transverse plane and through said frame end plate so as to remove the latter from the frame.

9. The method of claim 7 where each of said floor plates has a depression in the rearward portion thereof, so that corresponding portions of the floor plates lie below the lower side of the tunnel; characterized by cutting said floor plates so as to remove the portions thereof having said depressions therein; and installing new floor plate members to cover the areas opened up by the removal of portions of the original floor plates, including supporting said new floor plate members from the tunnel at a level susbtantially at least as high as the lower side of said tunnel, so as to afford said new floor plate members with a road clearance substantially at least as great as that of the tunnel.

10. The method of claim 7, including:

severing the floor plates from the tunnel along lines of severance extending along opposite sides of the tunnel for a predetermined distance forwardly of said forward transverse plane;

bending the remaining portions of said floor plates through a small upward angle of inclination along a bend line extending transversely of the tunnel and through the forward ends of said lines of severance, in such a manner that said remaining portions of said floor plates extend aft of said bend line along the sides of said tunnel at an upward angle of inclination relative to said tunnel; and positioning said floor plate members at said upward angle of inclination, with forward portions thereof over-lapped with aft regions of the upwardly inclined parts of said remaining portions of the original floor plates.

No references cited.

JOHN F. CAMPBELL, *Primary Examiner.*

THOMAS H. EAGER, *Examiner.*